P. L. LEISSE.
CONICAL GEAR WHEEL AND THE LIKE.
APPLICATION FILED NOV. 17, 1914.

1,178,810.                    Patented Apr. 11, 1916.

Inventor
Pierre L. Leisse,

UNITED STATES PATENT OFFICE.

PIERRE LÉONARD LEISSE, OF BILLANCOURT, FRANCE, ASSIGNOR TO LOUIS RENAULT, OF BILLANCOURT, SEINE, FRANCE.

CONICAL GEAR-WHEEL AND THE LIKE.

1,178,810.  Specification of Letters Patent.  Patented Apr. 11, 1916.

Application filed November 17, 1914. Serial No. 872,558.

*To all whom it may concern:*

Be it known that I, PIERRE LÉONARD LEISSE, citizen of the French Republic, residing at Billancourt, Department of the Seine, in France, have invented certain new and useful Improvements in Conical Gear-Wheels and the like; and I do hereby declare the following to be a full, clear, and exact description of the invention, such as will enable others skilled in the art to which it appertains to make and use the same.

The invention relates to conical gear wheels and has for its object to insure silent meshing and facilitate the machining operations.

For the purpose of decreasing the noise created by the running of conical gears, it has already been proposed, to form their teeth helically; but if it is desired to preserve the nature of conical gears in which the point and the root of the teeth form conical surfaces the common apex of which is that of the normal or pitch cone, great difficulties are encountered when cutting these teeth. The cost of manufacture, moreover is very high.

Figure 1:
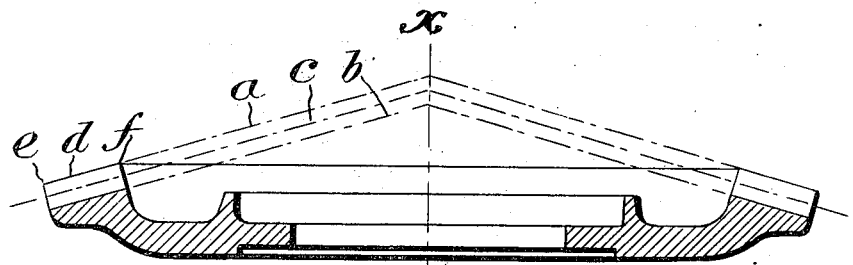
Figure 2:
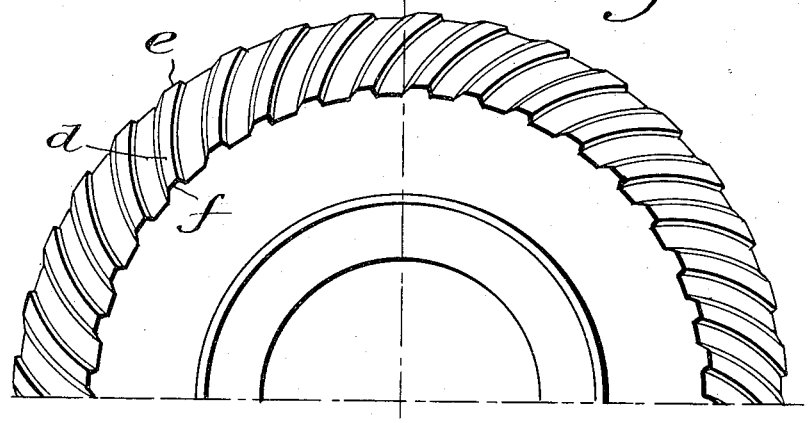

The new gear wheel which forms the object of the invention permits of running silently and considerably facilitates the manufacture thereof. It is shown in the accompanying drawing in which:

Figure 1 is a section taken on the axis. Fig. 2 is a plan view.

Its principal feature is the following: The cone $a$ and the cone $b$, representing the addendum cone and the dedendum cone of the teeth, respectively, instead of having their apices at the same point in the axis $x$—$x$ are two parallel cones. Both cones are parallel to the normal or pitch cone $c$. In other words, the tooth $d$ has the same height at the point $e$ as at the point $f$.

If the plan view of the gear is considered, the teeth have the helical shape shown in Fig. 2.

The constant height of the teeth permits of forming the gear with a milling cutter or any other shaping tool.

In practice, the faces of two gears which are to mesh, are determined in such a manner that the meshing should be perfect for the small diameter of the wheels, that is to say at the point $f$. The faces do not have quite the theoretical profile at the large diameter $e$ but the difference between this profile and the practical profile is very small and does not interfere in the least with the silent and good operation of the gears.

It must be pointed out that in view of the helical shape of the tooth, the gearing is very silent, because it is possible to insure by selecting a suitable pitch and dimensions of the teeth, a constant meshing of a plurality of teeth so that there is no shock even if the profiles of the two gears do not register quite exactly.

I claim:

1. A bevel gear having helically-formed teeth of the same height throughout their length.

2. A bevel gear having helically-formed teeth, the pitch cone, addendum cone and dedendum cone of which are all parallel, for the purpose described.

In testimony whereof I affix my signature, in presence of two witnesses.

PIERRE LÉONARD LEISSE.

Witnesses:
T. RITTAUD,
A. CROISY.

Copies of this patent may be obtained for five cents each, by addressing the "Commissioner of Patents, Washington, D. C."